Sept. 15, 1936.   J. C. WELLS   2,054,351
OPHTHALMIC LENS
Filed July 12, 1933
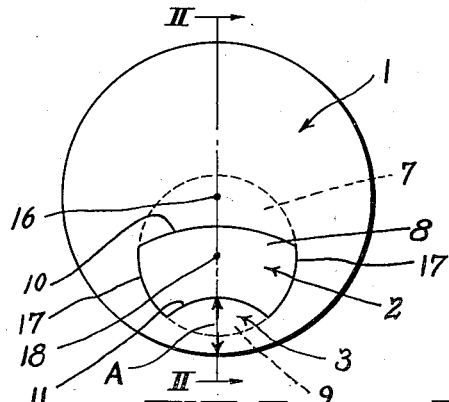
FIG. I.
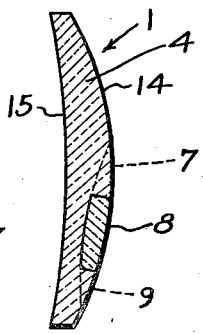
FIG. II.
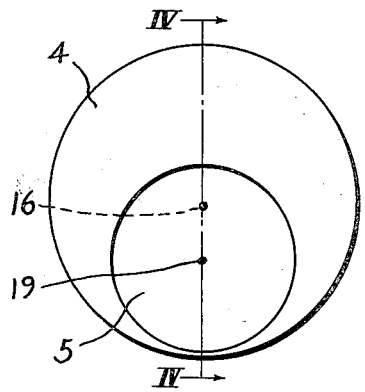
FIG. III.
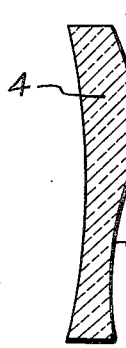
FIG. IV.
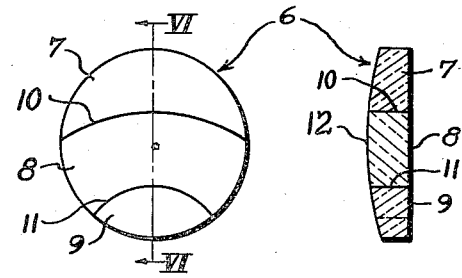
FIG. V.    FIG. VI.
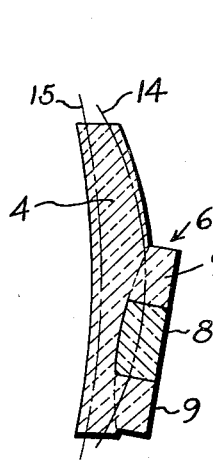
FIG. VII.
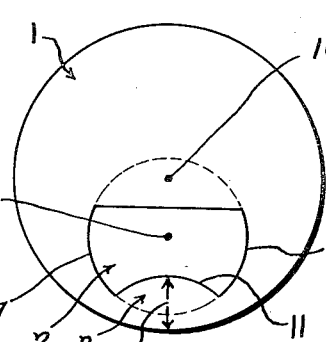
FIG. VIII.
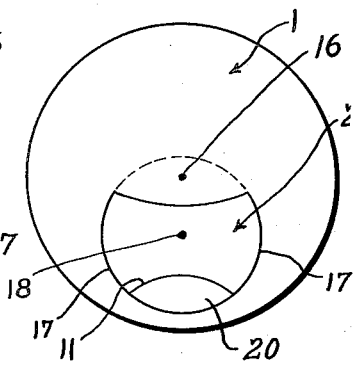
FIG. IX.
INVENTOR
Joel Cheney Wells.
BY
Harry H. Still
ATTORNEY Patented Sept. 15, 1936

2,054,351

UNITED STATES PATENT OFFICE 2,054,351

OPHTHALMIC LENS

Joel Cheney Wells, Southbridge, Mass., assignor to American Optical Company, Southbridge, Mass., a voluntary association of Massachusetts Application July 12, 1933, Serial No. 680,059

2 Claims. (Cl. 88—54)

This invention relates to improvements in lenses and has particular reference to an improved bifocal or multifocal lens and method of making the same.

One of the principal objects of this invention is to provide a multifocal or bifocal lens of this character having the focal fields arranged so that the line between the distance and reading fields will fall between the optical center of the distance field and the optical center of the segment per se of the reading field and located with respect to said parts so that the eye of the wearer will be substantially over the optical center in either part when the eye is free of said line, and the bottom of said segment located below the optical center thereof to provide a good height of reading field, and the said top and bottom lines of the segment shaped to break up or scatter reflections along said lines and the said bottom line positioned and arranged to give increased space below said line and the bottom edge of the lens, and the width of said segment such as to give a good wide field of vision.

Another object of this invention is to shape the abutting edge surfaces of the different focal fields of a bifocal or multifocal lens of the type having its focal fields formed of separate pieces of glass of different indices of refraction secured together edge to edge so that substantially all light rays reflected from said abutting edge surfaces will be broken up or scattered.

Another important object of the invention is to provide an improved bifocal or multifocal lens wherein the order of the different focal fields, traveling from the top to the bottom of the lens, will be distance, reading, and distance, the lower distance field being adapted particularly for use in going up or down stairs, getting on or off automobiles or trains, or stepping up or down from curbings, etc.

Another object of the invention is to reduce vertical prismatic displacement when the eye passes from the upper distance field into the reading field and from the reading field into the lower distance field.

Another object is to provide novel means and method of forming a distance field below the reading field of a bifocal or multifocal lens of the type having its reading field located relatively close to the lower edge of the lens.

Another object is to provide improved means whereby the dividing line between the reading field and upper distance field of the lens may be positioned in any desired location relative to the optical or geometrical center of said distance field without danger of restricting the height and area of the lower distance field to such an extent that it will be impractical for use, and without having to remove an excessive amount of the reading field.

Another object is to provide a bifocal or multifocal lens with a reading field which is greater in width than in height.

Another object is to provide a bifocal or multifocal lens wherein the order of the different focal fields, traveling from the top to the bottom of the lens, will be distance, reading, and intermediate.

A further object is the provision of novel and improved means and process for producing lenses of the above character on a practical commercial basis and of controlling the location of the optical or geometrical centers of the different focal fields of the finished lens.

Other objects and advantages of the invention will become apparent from the following description taken in connection with the accompanying drawing and it will be apparent that many changes may be made in the details of construction, arrangement of parts, and steps of the process shown and described without departing from the spirit of the invention as expressed in the accompanying claims. I, therefore, do not wish to be limited to the exact details and steps of the process shown and described as the preferred forms only have been shown by way of illustration.

Referring to the drawing:

Fig. I is a front elevation of a lens embodying the invention;

Fig. II is a sectional view taken on line II—II of Fig. I;

Fig. III is a front elevation of the major blank showing a step in the process of manufacture;

Fig. IV is a sectional view taken on line IV—IV of Fig. III;

Fig. V is a front elevation of the segment portion of the lens;

Fig. VI is a sectional view taken on line VI—VI of Fig. V;

Fig. VII is a view similar to Fig. IV showing the segment secured to the major portion of the lens;

Fig. VIII is a view similar to Fig. I showing a modified form of the invention; and Fig. IX is a view similar to Fig. VIII showing a further modification.

It has been usual in the past in the manufacture of bifocal or multifocal lenses to secure or fuse a circular segment of glass of a different index of refraction from that of the major portion into a countersink formed in said major portion. It has been found from practice that a great amount of prismatic displacement and distortion exists in the marginal area of the segment of such lenses, which, when the eye passes from one focal field into the other, distorts and displaces the image to such an extent that it is very annoying to the wearer. This prismatic displacement and distortion, as is commonly known in the art, decreases as the eye approaches the optical center of the near vision segment of the lens, and for this reason recent developments have been directed to reducing the distance which the eye has to travel through this image displacing and distorting area to reach the vicinity of the most usable and undistorted area near the optical center of the segment. To accomplish this result, the upper portion of the segment was cut away on a straight line transversely of the reading field substantially midway between its top edge and its optical center, thereby forming a substantially three-quarter circle shaped reading field having a relatively thick straight top edge and the usual prior art circular bottom. This type of segment, although very efficient as to eliminating prismatic displacement and distortion when the eye moves downwardly from the distance field into the reading field, has in many instances in the past been subject to objectionable reflections at its line of division. This was due mostly to the tendency of the thick top edge to reflect an annoying continuous band of light. Prismatic displacement and distortion was encountered in the marginal area of the bottom of the reading field also. Another defect was that of the short focus of the lower area of the reading field which blurred the vision of the wearer and was very annoying and dangerous when going up or down stairs, stepping on or off automobiles or trains, or stepping up or down from curbings, etc.

It, therefore, is one of the primary objects of this invention to obviate the above mentioned difficulties by providing in a bifocal or multifocal lens of the above character a reading field having a distance field formed in the lower area thereof and utilizing only a small portion of the reading field, the upper edges of said reading and distance fields being shaped to break up the annoying band of reflected light.

Another advantage of applicant's invention is that the eye will encounter practically no prismatic displacement and distortion when passing from the reading field into the lower distance field.

Another feature of the invention is the provision of means, in instances where it is necessary to form a lens having its reading field relatively low on the lens and at a position which tends to reduce the area of the lower distance field, whereby the area of said lower distance field may be increased without removing an excessive amount of the reading field.

Referring more particularly to the drawing wherein like characters of reference designate like parts throughout the several views, the lens embodying the invention, as shown in Figs. I and II, comprises an upper distance field 1, a reading field 2, and a lower distance field 3. The lens, as shown in Figs. III to VI inclusive, comprises a major lens blank 4 formed preferably of crown glass having a given refractive index, and having a segment countersink or seat 5 formed in one face thereof in the usual prior art manner. This segment countersink or seat 5 is provided with a ground and polished surface of the required radius to produce the desired power in the finished reading field of the lens. The major blank 4 may be flat or meniscus shaped, as desired, and the countersink or seat 2 may be formed in the convex or concave face of the blank, depending upon which face the segment or composite button 6 is to be secured. The segment or composite button 6 is preferably formed of three pieces of glass 7, 8, and 9 fitted together edge to edge along lines of joinder 10 and 11 of predetermined shapes and are fused together in this relation. The composite button thus formed is provided on one face with a continuous curve 12 substantially equal to that of the curve of the countersink or seat 2 and is fused in said countersink or seat as shown in Fig. VII.

The interengaging surfaces of the glasses 7 and 9, which are preferably formed of the same kind of glass or glass of a similar nature to that of the major blank 4, are adapted to merge with said blank 4 and disappear when the parts are in fused relation with each other. The portion 8, which is formed of a flint, barium crown, or other suitable glass having a different index of refraction from that of the major blank 4 and of the portions 7 and 9, remains visible after fusion.

After the parts have been properly fused to each other, the blank 13, as indicated by the dot and dash lines in Fig. VII and by the full lines in Fig. II, is provided on one face thereof with a continuous curve 14, and on the opposite face with a continuous curve 15. The curve 14, which is on the segment side, is preferably the base curve, and the curve 15 on the opposite side is preferably the prescription curve. It is apparent that although applicant has shown the segment 6 as being secured to the convex side of the lens, it may be secured to the concave side if desired.

The portion 8, which is the only portion of the segment that will be visible in the finished lens, is provided at the top with a relatively thick edge forming the dividing line 10 between the upper distance field 1 and the reading field 2 of the lens. This dividing line is preferably formed with a cylindrical surface which curves downwardly, as shown in Fig. I, but if desired may be made straight, as shown in Fig. VIII, or with a cylindrical surface which curves upwardly, as shown in Fig. IX. This dividing line 10 may be placed in any desired relation with respect to the optical or geometrical center 16 of the major portion 4 or distance field 1 of the lens by locating the center 19 of the countersink 5 in predetermined relation with the center 16 prior to forming the countersink and fusing the segment 6 therein. This relation may also be varied by removing more from the top of the segment portion 8 when the portions 7, 8, and 9 are being shaped and fused together.

The outline shape of the side edges 17 is a line of revolution produced by the curve of the countersink and is finished to a knife edge or feather edge during the forming of the optical surface 14 on the lens.

To form the lower distance field 3 of the lens, the segment portion 8 is cut away along the lower line 11 to form a downwardly curving cylindrical surface shaped so as to increase the height of the field 3 along the vertical axis of the lens. The portion which has been cut away from the lower part of the portion 8 is then replaced by the portion of glass 9 which is of the same, or substantially the same, kind of glass as is used for the major blank 4. This line 11 is preferably cylindrical and curved downwardly, as previously stated, to increase the distance between the line 11 and the lower edge of the lens along the vertical axis or most useful portion of the distance field, as indicated by the arrows A.

It is apparent that by shortening the radius of the downcurve 11 and by moving the center of its cylindrical curve nearer the center 18 of the reading field 2 that the height A of the lower distance field 3 will be increased and that by lengthening the radius and lowering the position of its center the height A will be decreased. The object of forming the lower distance field with a downcurving cylindrical surface 11 is to break up annoying light reflections and to avoid removing an excessive amount of the reading field 8 such as would be the case if the line 11 were made straight across the reading field instead of being curved as shown. If the edge 11 were made flat all light rays impinging on said edge would be reflected in the same direction and would cause the eye to constantly look through a band of annoying light. If made cylindrical, as shown in Fig. I, the light rays impinging thereon would be deflected in different directions and the eye would see only a narrow streak of light, if any. This is due to the cylindrical shape of the surface at the edges 10 and 11 which deflect substantially all light rays away from the eye. By moving the lines 10 and 11 nearer the optical center 18 of the segment, the prismatic displacement and distortion encountered in passing from one focal field into the other in a vertical direction is greatly reduced, the reason being, as previously stated, that the prismatic displacement and distortion decreases as the eye approaches the area of the optical center 18.

Referring to Fig. I—the optical center 16 of the major portion is located substantially the distance of the radius of the pupil of the eye above the line 10, and the line 10 lies about the same distance above the optical center 18 of the segment per se, which insures that when the pupil of the eye is free of the line 16 it will be directly over either the point 16 or the point 18 as the case may be, which insures that at these points there is no prismatic displacement present, but that the eye is using the most perfect part of the lens.

In Fig. IX there is shown a trifocal lens having the portion 20 formed of a glass of a different index of refraction from that of the major blank 4 and the portion 8. In this instance the portion 20 is adapted to provide an intermediate field, that is, a field having a longer focus than that of the reading field 2, but shorter than that of the distance field 1. It is apparent also that the order of the fields may be reversed to produce any desired combination by varying the indices of refraction of the different portions of the composite segment 6.

In all instances the upper edge 10 of the reading field 2 is preferably flatter or of a greater radius than that of the upper edge 11 of the reading field 3, or the intermediate field 20, as the case may be. The portion 8 in all instances is much wider than it is high to provide means whereby the wearer will have a wider reading range. It is also apparent that the reading field 2 extends downwardly at the sides of the lower distance field 3, and therefore increases the reading range at said locations. Attention is also directed to the fact that in the finished lens the upper distance field 1 extends downwardly at the sides of the reading field 2.

Although applicant has described the major blank 4 as being formed of a crown glass, it is to be understood that it may be formed of any desired glass having any desired refractive index and that the portions 7, 8, and 9 may be formed of any suitable glasses for producing the results desired. In all instances the preferred form of lens will have an upper distance field 1, a reading field 2, and a lower distance field 3 with downward curving dividing lines 10 and 11, the height of the lower reading field being dependent upon the position of the reading field 2 on the lens, the radius of the curve of the line 11, and upon the location of the center of said curve relative to the center 18 of the reading field. It is also apparent that any combination of glasses having any suitable refractive indices, reciprocal relative dispersions, and expansion factors may be used in forming lenses of this character, depending mainly upon the nature of the lens and its requirements, it being understood that the controlling of these factors is for the purpose of obtaining the desired powers, fusion faculties, and color properties.

The location of the optical centers of the different focal fields of the finished lens and the dimension of the reading field of the lens is such that when the eye passes over the dividing line 11 in an upward direction and the pupil clears the dividing line it immediately lies in the vicinity of the optical center or most usable portion of the reading field and when it passes upwardly into the distance field and the pupil clears the dividing line it likewise immediately lies in the vicinity of the optical center or most usable portion of the distance field and vice versa. The optical centers of the reading field and major distance fields are so arranged that the position of the image of the object viewed through said fields will not change when the eye alternatingly shifts from one field to the other. The relatively thick edges or lines of joinder between the different fields of the lens are preferably so arranged that one of said thick edges or lines lies between the optical center of the reading field and the optical center of the upper distance field and the other thick edge or line of joinder lies between the optical center of the reading field and the geometrical center of the lower field of the lens particularly along the vertical axis of the lens.

It is apparent that although applicant shows and describes the above arrangement the said optical or geometrical centers and the positions of the dividing lines relative to said centers may be varied as desired, that is, the dividing lines may pass through said centers or above or below as desired.

It is understood that the segment may be made in one, two, or more parts as desired depending on the type of lens desired, the number of the portions of the segment not being of the essence of the invention which deals primarily with the relative locations of the optical centers, the breaking up of reflections along the dividing lines and the provision of an increased field below the segment.

From the foregoing description it will be seen that I have provided simple, efficient, and economical means and process of accomplishing all the objects and advantages of the invention.

Having described my invention, I claim:

1. A multifocal lens comprising a major portion having a distance vision field provided with a countersink therein, a button secured in said countersink, said button having upper and lower portions formed of glass of substantially the same index of refraction as that of said major portion and an intermediate portion of a different index of refraction from that of said major portion and having shouldered upper and lower edges and relatively thin knife-like end edges, the end edges being formed by a line of revolution and its upper edge extending substantially transverse of said button and its lower edge also extending transversely of said button and formed circular and arching upwardly from its ends towards the vertical meridian of the lens, the length and center of radius of which is such that the space between the bottom edge of said intermediate portion and the bottom edge of said distance vision portion along the vertical meridian through the optical center of said intermediate portion provides a distance field below said intermediate field which may be varied in said vertical meridian by shortening the radius of curvature of said lower edge and moving the center thereof upwardly of the vertical meridian whereby the width between the lowermost points of said intermediate portion may be held substantially constant and yet permit the varying of the height of the lower distance field, said multifocal lens having continuous optical surfaces on its opposed faces of predetermined curvatures controlling the optical power of the different focal fields of the lens.

2. The method of forming a multifocal lens comprising providing a major portion of lens medium with a countersink, forming a composite button by securing three pieces of glass in edge to edge relation with each other with the edges between said pieces being relatively thick, the intermediate portion of said composite button being formed of glass of a different index of refraction from that of the major portion and the remaining portions of said composite button being formed of glass of sensibly the same index of refraction as said major portion, joining the edge of one of said pieces of glass with the upper edge of the intermediate portion to provide a substantially transversely extending upper line of joinder between the intermediate and distance portion of the lens and joining the lower piece of glass with the lower edge of the intermediate portion to form a relatively thick line of joinder between said intermediate portion and the lower distance field of the lens, forming said lower line of joinder circular in contour and controlling the length and position of the center of radius of said circular contour so that the space between the bottom edge of said intermediate portion of glass and the bottom edge of said adjacent distance vision portion along the vertical meridian of the lens and through the optical center of said intermediate portion provides a distance field below said intermediate field of the desired height and arranging said lower edge so that it may be varied in said vertical meridian by changing the radius of curvature of said edge while the width between the lowermost points of said intermediate portion may be held substantially constant, securing said composite button thus formed in the countersink with the upper and lower edges extending transversely of the vertical meridian of the lens and forming continuous optical surfaces on the opposed faces of said lens whereby the opposed ends of said reading or intermediate portion will be reduced to substantially knife-like edges shaped to a line of revolution.

JOEL CHENEY WELLS.